United States Patent

[11] 3,592,320

[72] Inventor Hans Binggeli
Lerchenfeld B/Thun, Switzerland
[21] Appl. No. 889,075
[22] Filed Dec. 30, 1969
[45] Patented July 13, 1971
[73] Assignee Watch Stones Co. Ltd.
Canton of Berne, Switzerland
[32] Priority Jan. 8, 1969, Jan. 8, 1969
[33] Switzerland
[31] 180/69 and 181/69

[54] APPARATUS FOR FEEDING WORKPIECES FROM A MAGAZINE TO A LASER BEAM IMPACTING LOCATION
5 Claims, 3 Drawing Figs.
[52] U.S. Cl. .................................................. 198/19, 221/211, 198/209
[51] Int. Cl. .................................................. B23q 5/22
[50] Field of Search .......................................... 198/19, 20, 28, 209; 221/211

[56] References Cited
UNITED STATES PATENTS
2,383,523 8/1945 Thornburgh .................. 221/211 X
3,441,121 4/1969 Pastuszak ..................... 198/19 X Primary Examiner—Richard E. Aegerter
Assistant Examiner—H. S. Lane
Attorney—Werner W. Kleeman ABSTRACT: A novel apparatus for feeding workpieces from a magazine to a laser beam impacting location is disclosed. The novel apparatus comprises a rotary feed means provided on its bottom surface with at least one suction opening, the feed means being planar shaped in the region of the suction opening. During rotation of the feed means, the suction opening passes by the outlet of a magazine channel in which the workpieces, such as watch stones are held, the workpiece being sucked into the suction opening and retained on the rear planar bottom surface of the feed means. Further rotation of the feed means brings the workpiece to a stripping or wiping member whereat the workpiece is removed or stripped from the feed means and accurately positioned within a V-shaped holding notch disposed diametrically opposite the magazine with the feed means bridging the gap between the magazine and the holding notch. Subsequently, the now positioned workpiece is acted upon and perforated by means of laser pulses and then is removed from the notch. The feed means continuously rotates and thus, the transport operation proceeds smoothly, free of the deleterious effects of prior art oscillatory feeding operations.

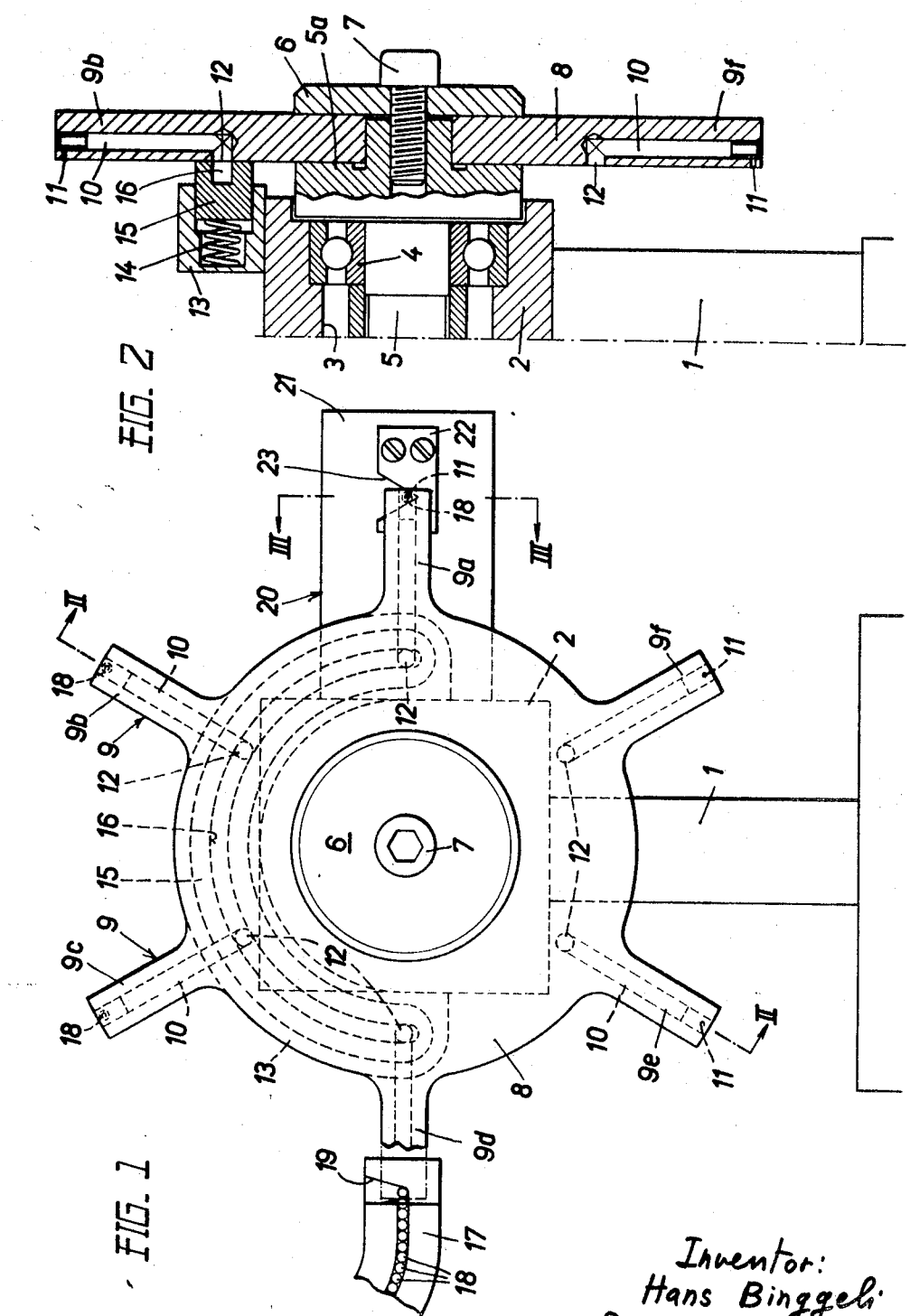

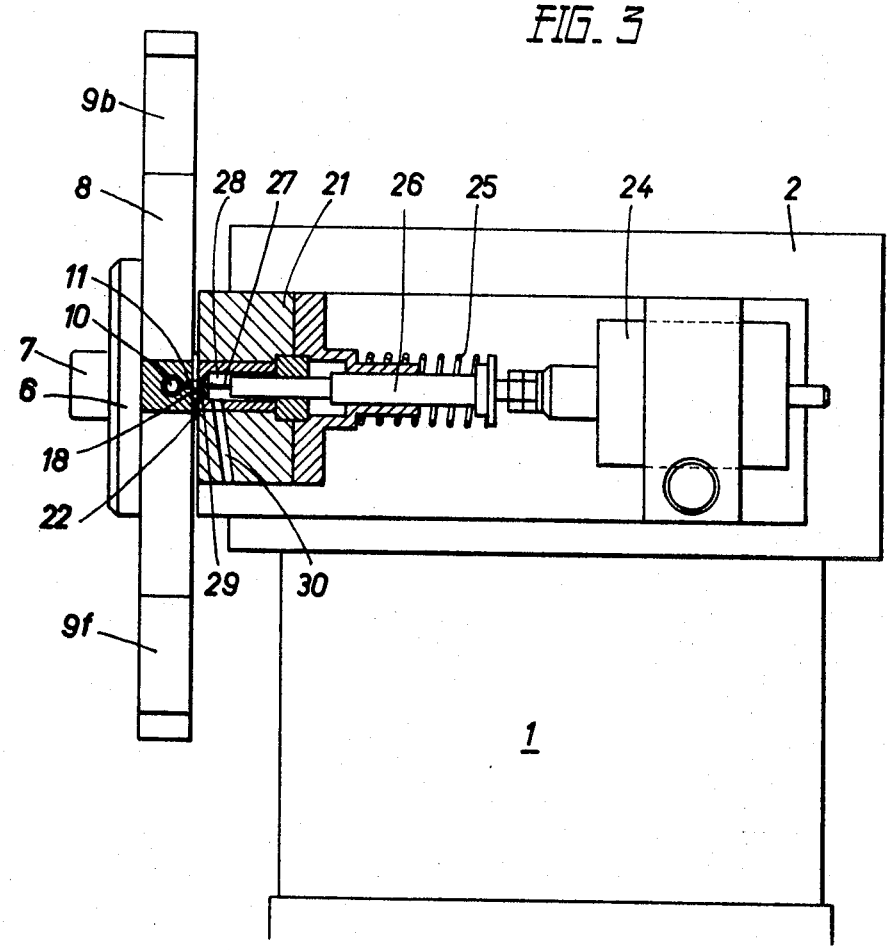

APPARATUS FOR FEEDING WORKPIECES FROM A MAGAZINE TO A LASER BEAM IMPACTING LOCATION

BACKGROUND OF THE INVENTION

This invention generally relates to feeding devices and particularly concerns an apparatus for transporting workpieces held in a magazine to a laser beam impacting location.

The impacting or perforation of workpieces such as watch stones, for example, by means of laser beams involves particularly strenuous demands and design considerations upon the holding or supporting structure for the workpieces at the actual impacting location. Specifically, the workpiece itself must precisely be held in a given position to a tolerance within an order of magnitude of a few microns relative to the positioning of the laser beams. Considering these close required tolerances, difficulties arise particularly as concerns two areas. For one, the workpiece oftentimes cannot be removed from the initial magazine channel in which it is maintained with any degree of precision when one considers that contamination of the magazine channel occurs and cannot be avoided over a period of time. Secondly and more importantly, the transfer of the workpieces from the magazine channel to the laser beam impacting location must take place such that all vibrations are avoided which would lead to a relative oscillation between the holding device at the impacting location on the one hand, and the laser installation on the other. This latter requirement practically precludes the utilization of all known feed means which intermittently are moved back and forth between the outlet end of the magazine channel in which the workpiece is initially held and the holding installation at the laser beam impacting location to which the workpieces are ultimately delivered.

SUMMARY OF THE INVENTION

Considering the above-defined problems, the development of a feed means was indicated which, in contrast to all feed means which are presently known, is moved smoothly, steadily and uniformly between the outlet opening of the magazine channel and the laser beam impacting location so as to avoid any oscillations which would deleteriously impair the precision of the relative position between the laser beams and the workpiece subsequently disposed in a holding device at the impacting location. It is a primary object of the instant invention to provide such a feed means.

A further, though equally important object of the instant invention concerns the provision of a feed means and installation of the type described which not only affords a smooth and uniform movement of the feed member but which further affords an extremely precise feeding of the workpiece from the magazine channel into a holding device at the impacting location, such precise feeding being achieved even when the initial position of the workpiece in the magazine channel varies within certain limits.

These objects as well as others which will become apparent as the description proceeds, are implemented by the instant invention which, as aforementioned generally comprises a feeding installation for transporting workpieces held initially in a magazine to a laser beam impacting or perforating location. The actual feed member or means of the installation comprises a rotary member which, on its bottom side is provided with at least one suction opening, the region surrounding the suction opening being planar shaped. When the feed means rotates, the suction opening passes by the outlet portion of the magazine channel such that the workpiece therein is sucked into and retained on the rear, planar bottom surface of the feed means. As the feed means continues its steady rotation, the retained workpiece passes by a stripping or wiping means which cooperates with the bottom side of the feed means and defines a holding notch, the stripping or wiping means removing the workpiece from the feed means and placing the same in a precise fashion into the holding notch whereat the laser beam perforation or impacting operation subsequently follows.

BRIEF DESCRIPTION OF THE DRAWINGS

The invention itself will be better understood and further features and advantages thereof will become apparent from the following detailed description of a preferred embodiment, such description referring to the appended sheets of drawings, wherein:

FIG. 1 schematically illustrates a front view of the novel feed means of the instant invention disposed between the outlet end of a magazine channel and a holding device;

FIG. 2 depicts an elevational view, in section, taken along line II-II of FIG. 1 of the novel invention; and FIG. 3 depicts an elevational view, in section, taken along the line III-III of the invention of FIG. 1.

DETAILED DESCRIPTION OF A PREFERRED INVENTIVE EMBODIMENT

Referring now to the drawings, the inventive embodiment depicted therein defines an installation by means of which workpieces such as platelike shaped, nonperforated watch stones are removed from a magazine channel in which they are initially maintained, and fed to a holding device where they are securely held for subsequent perforation by means of laser beams. Following the perforation, the workpieces are subsequently ejected from the holding device.

Specifically referring now to the component parts of the novel installation, it will be seen that a stand or post 1 carries a bearing block 2 having a bore 3 in which an axle 5 is rotatably maintained by means of a bearing 4. Axle 5 includes a head portion 5a at its free end onto which a feed means preferably constructed as a transport plate 8 having a planar-shaped bottom side is attached by means of support plate 6 and screw 7.

Transport plate 8 is provided with six radially outwardly extending arms 9, each of which arms 9a through 9f is provided with a suction channel 10 connecting a suction opening 11 disposed on the inner plate side with a suction opening 12. Bearing block 2 carries a cooperating portion 13 on its upper surface, which portion 13 extends in a semicircular arc through approximately 180° and which portion 13 itself carries a semicircular connecting piece 15 resiliently urged forwardly, i.e., toward the right of FIG. 2, by means of springs 14. The connecting piece 15 includes a channel 16 having dimensions selected such that channel 16 communicates and covers the suction openings 12 of the radial arms 9a through 9f. A nonillustrated suction source is also coupled with channel 16 such that channel 16 serves to operatively connect the nonillustrated suction source with the various suction openings 11 of the radially outwardly extending arms 9.

A magazine 17 as shown in FIG. 1 is provided within the area of the arms 9, the magazine having a channel, the outlet end of which terminates in a notch 19 wherein the nonperforated workpieces, i.e., watch stones 18, are held. Disposed diametrically opposite the outlet end of the magazine 17, is a holding and ejecting device 20 which includes a drilled block 21 having a wiper sheet or means 22 threadedly disposed thereto on the front side thereof. Wiper sheet or means 22 incorporates a V-shaped holding notch 23 and is disposed in such a fashion that when the plate 8 is rotated, the planar bottom side of the arms 9 closely graze across the wiper sheet 22.

An ejector mechanism is disposed in the block 21 and comprises a relay 24, a piston 26 operable under the influence of a spring 25, and an ejector rod 27, all as shown in FIG. 3. The ejector rod 27 is constructed such that it can pass through the V-shaped holding notch 23 so as to impinge and abut upon a watch stone held in the notch 23. A hollow cavity 28 is coupled with a nonillustrated suction source via a channel 30. Cavity 28 communicates with the holding notch 23 via a through pass channel 29 for the ejector rod and, as illustrated, the ejector rod 27 is disposed in the cavity when in a resting position.

Now, as is known, a nonillustrated laser installation is disposed in the region of the holding and ejecting device 20, this region defining the impacting or perforation location. The laser installation may be of any known type and is firmly attached to the stand or post 1 so as to avoid any relative movement with respect to the impacting location and specifically the notch 23.

From the above-described construction, it should be apparent that suction openings 11 of those radial arms 9 having suction openings 12 disposed above channel 16, are connected with the nonillustrated suction source by means of channels 10 and 16. This construction is also evident for radial arm 9a, which, during a steady and continuous rotation of the plate 8, completes a full revolution directly above the notch 19 of magazine 17. The respective suction opening 11 of radial arm 9a is thus moved so closely past the notch 19 that the workpiece, i.e., the nonperforated watch stone 18 situated therein, is sucked into the arm and retained on the rear, planar bottom surface of the plate 8. During further continuous rotation of plate 8, the respective radial arm along with the watch stone which is now retained on the bottom side through suction, finally reaches the region of the stripper means or holding device 20, i.e., arm 9a reaches the illustrated position in the drawings. Stripper sheet or means 22 is disposed so closely to the path of the radial arms 9 that the respective nonperforated watch stones held in each arm are stripped or wiped off the plate and placed within the V-shaped holding notch 23 wherein the watch stone is brought into a precisely defined position determined by the shape and disposition of the two side edges of the notch forming the V-shape.

The non transferred watch stone 18 is retained in this notch, i.e., the impacting location, via through pass channel 29 and cavity 28 and the nonillustrated suction source. During further steady and continuous rotation of the plate 8, during which time the respective radial arm pivots beyond the region of the stripper and holding device, laser bursts or pulses are triggered by a nonillustrated apparatus and the relay 24 is then subsequently actuated.

Actuation of relay 24 is transmitted via piston 26 to an ejector rod 27 such that the ejector rod passed through channel 29 and pushes forwardly so as to eject the watch stone 18 which now has been perforated. Of course, the application of suction would be eliminated. Subsequently, relay 24 disengages or drops off once again the ejector rod 27 is guided back into its illustrated rest position by means of spring 25. In the course of further continuous rotation of the plate 8, the next radial arm 9 reaches the area of the holding and ejecting installation 20, and the above-described operation would repeat.

The above-described and illustrated feed installation has manifold advantages which arise from the fact that the precision with which the nonperforated watch stone can be placed upon the transport arm from its position in the outlet channel of the magazine is not a determining factor. Any irregularities in this initial transfer is compensated for by positioning of the watch stone in its final disposition in the V-shaped holding notch of the stripper sheet or means. Accordingly, should the movement of the watch stones in the magazine channel be irregular for some reason or another such as contamination, and should some watch stones, for example, only reach the end position in the channel in an approximate manner, this will in no manner influence the precision with which the watch stone is retained at the actual impacting location.

Above all, the above-described installation allows the utilization of a feed means which is steadily driven whereby all possible oscillations are avoided of the type which could deleteriously affect the precision of the relative position between the watch stone retained at the impacting location and the laser beams. Accordingly, the novel installation provides a means for effectively impacting a watch stone with laser beams and avoids the disadvantages of the prior art.

As should now be apparent, the objects initially set forth at the outset to this specification, have been successfully achieved.

Accordingly, what I claim is:

1. In an installation for transporting workpieces from an outlet channel of a workpiece magazine to a laser beam impacting location, the improvement comprising: rotary feed means disposed between the outlet channel and the impacting location, said feed means being provided with at least one suction opening at a lower planar side surface thereof for removing a workpiece from the outlet channel and retaining the workpiece on said feed means; and holding means disposed at the impacting location, said holding means including stripper means cooperating with said planar surface of said feed means while said feed means rotates to remove said workpiece retained on said feed means, said holding means further including a holding notch communicating with a suction source for maintaining said removed workpiece in position for subsequent impacting.

2. The improvement defined in claim 1, wherein said feed means comprises a rotary plate having a plurality of radially outwardly extending arms, each arm incorporating of suction opening, the arcuate path of travel of said arms sweeping by the outlet channel of the workpiece magazine and said holding means.

3. The improvement defined in claim 2, wherein the rotation of said feed means is continuous.

4. The improvement defined in claim 3, wherein said holding notch is V-shaped.

5. The improvement defined in claim 4, further including relay ejector means for selectively ejecting workpieces from said V-shaped notch after impacting has been effected.